April 30, 1963 D. J. HINKEIN ETAL 3,088,041
SINGLE PULSE GENERATOR EMPLOYING INTEGRATOR AND LOGIC GATES TO DETECT AND FORM CLOCK SYNCHRONIZED OUTPUT
Filed Dec. 15, 1959
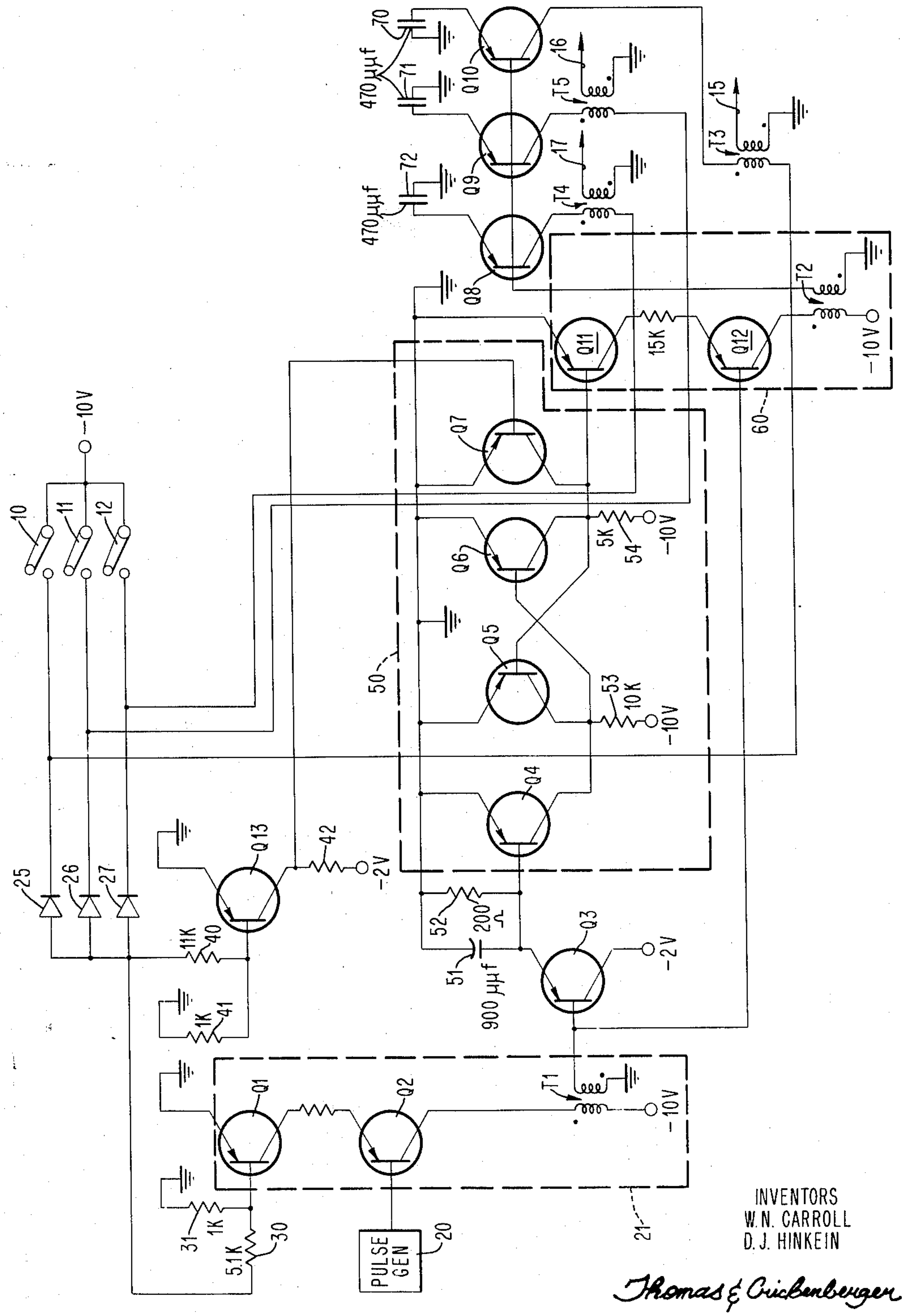
INVENTORS
W.N. CARROLL
D.J. HINKEIN
Thomas & Crickenberger
ATTORNEYS United States Patent Office 3,088,041
Patented Apr. 30, 1963

3,088,041

SINGLE PULSE GENERATOR EMPLOYING INTEGRATOR AND LOGIC GATES TO DETECT AND FORM CLOCK SYNCHRONIZED OUTPUT

Donald J. Hinkein, Germantown, and William N. Carroll, Rhinebeck, N.Y., assignors to International Business Machines Corporation, New York, N.Y., a corporation of New York Filed Dec. 15, 1959, Ser. No. 859,717
1 Claim. (Cl. 307—88.5)

This invention relates to a device for generating a single pulse and more particularly to such a generator where the request for a single pulse is made at random times but the output pulse is supplied in synchronism with an oscillator.

In various computing devices push buttons are provided so that in some instances the machine may be operated manually. During normal operation the computing machine is manipulated automatically by pulse signals from an oscillator or a clock. It is sometimes desirable to suspend the automatic operation and manipulate the machine one step at a time by depressing a push button once for each step. As the push button is depressed and released successively the machine is caused to perform successive steps in its operation. When manual operation is resorted to it is desirable to use pulses from the computer clock for the step by step operation under manual control. The problem arises, however, in getting only one of the clock pulses for each step of operation. It is essential to provide one, and only one, clock pulse for each instance when the push button is depressed and released in many types of computer programs, especially checking routines to detect errors in a computer program. The problem is further complicated because the operation of the push button is asynchronous with the generated clock pulses. A given computing machine usually requires clock pulses having a definite amplitude and time duration. Because the clock and the push button are operated asynchronously there arises the probability that a portion of a given clock pulse may be supplied to the computer. The portion of a pulse may be a quarter, one-half or any other fraction of a pulse. Whatever the case, the time duration of the pulse is reduced although its amplitude may be unaffected. This unintentional reduction of pulse duration is sometimes referred to as pulse slivering, and such pulses give rise to unreliable computer operation.

The foregoing difficulties are overcome by the present invention which provides a device that responds to signals supplied by a push button and signals supplied by a clock to supply a single output pulse in synchronism with a free running clock. A single pulse for each depression of a push button permits step by step operation. Slivering of pulses is prevented so that reliable operation results. By providing the single output pulse in synchronism with the computer clock it becomes immaterial whether automatic or push button operation is employed, and a change from one type of operation to the other involves no problems of synchronization as might be the case if manual and automatic operation were performed by separate pulse sources.

A single pulse generator is provided according to this invention which includes a plurality of switches coupled to a coincident energization device which responds to signals from any one of the operated switches and signals from a pulse source to provide an output signal to an integration device which in turn is coupled to a pulse generating circuit. If the input pulse is slivered, the integration device averages it with respect to time, but the output signal fails to operate the pulse generation device. If the input pulse is not slivered, the integration device averages it with respect to time but provides an output signal which operates the pulse generation device. The pulse generating circuit includes a storage device which is charged by hte first pulse received, and an output pulse is provided. Once the storage device is charged by the first pulse, the pulse generation device is blocked and is prevented from supplying further output pulses in response to input pulses.

In one illustrative arrangement according to this invention signals supplied by depressing a push button switch and signals from a clock operate a coincidence gate or an AND circuit the output of which is supplied to an integrator. The output of this AND circuit is coupled to a second AND circuit. The second AND circuit also has the output from one side of a flip-flop coupled thereto. The integrator has its output coupled to the flip-flop and operates the flip-flop in a manner to condition the second AND circuit. The second AND circuit then passes oscillator pulses to its output. The output of the second AND circuit is coupled to one or more output gates. The number of output gates is equal to the number of push button switches employed and when a switch is depressed it conditions its associated output gate. Each output gate has a storage device, such as a condenser, associated therewith. When an output gate is conditioned by signals from the associated depressed push button switch, this gate responds to an oscillator pulse from the second AND circuit to provide an output pulse and charge up the storage device. The output pulse may be employed to operate a computing device. The charge established in the storage device biases the output gate so as to prevent the passage of further clock pulses. An inverter is coupled between the push button switches and one side of the flip-flop, and when the push button switch is released the inverter operates the flip-flop to decondition the second AND circuit.

An important aspect of this invention is to prevent the slivering of pulses. According to this invention, this is accomplshed in the illustrative arrangement by using an integrator and a flip-flop between the first and second AND circuits. The integrator averages each oscillator pulse received and the flip-flop is so arranged that unless the integrator receives an oscillator pulse of full duration, the output of the integrator is not sufficient in magnitude to operate the flip-flop. If the flip-flop is not operated, the second AND circuit is not conditioned to pass oscillator pulses. Accordingly, slivered pulses cannot reach the output gates.

An important aspect of this invention is the provision of a single output pulse for each depression of a push button switch. This is accomplished in the illustrative arrangement by the provision of a storage device associated with an output gate which is charged up whenever the output gate passes an oscillator pulse. The charged storage device then deconditions the gate and prevents the passage of further oscillator pulses.

These and other features of this invention may be more fully appreciated when considered in the light of the following specification and the single FIGURE of the drawing which illustrates a synchronized single pulse generator according to this invention.

Referring to the drawing, a plurality of push button switches 10 through 12 are provided. The object is to develop single output pulses on lines 15 through 17 whenever a respective one of the switches 10 through 12 is depressed. A pulse generator 20 supplies pulses to the base of a transistor Q2. The transistors Q1 and Q2 constitute an AND circuit 21. Pulses from the pulse generator 20 serve as one input to the AND circuit 21, and signals supplied by depressing one of the push button switches 10 through 12 serve as the other input to the AND circuit 21. Diodes 25 through 27 are connected to respective push button switches 10 through 12. The anodes of these diodes are connected through a resistor 30 to the base of the transistor Q1 of the AND circuit Q1. The base of the transistor Q1 is connected through a resistor 31 to ground. The anodes of the diodes 25 through 27 are connected through a resistor 40 to the base of a transistor Q13. The base of this transistor is connected to ground through a resistor 41. The collector of the transistor Q13 is connected to a negative voltage source through a resistor 42. The collector of the transistor Q13 is connected to the base of a transistor Q7. The transistor Q13 and associated circuitry serve as an inverter circuit which turns the flip-flop 50 in the off condition when each of the switches 10 through 12 is open.

The transistor Q3 has a condenser 51 and a resistor 52 coupled between its emitter electrode and ground. The transistor Q3 and associated circuitry serve as an integrator which responds to pulse signals from the AND circuit 21 and averages these pulses with respect to time. The signals thus averaged are applied to the base of a transistor Q4 in the flip-flop 50. If an oscillator pulse from the AND circuit 21 is not slivered, it operates the transistor Q3 and causes charging of the condenser 51 for a period of time which is sufficient to raise the amplitude of the signal high enough to render the transistor Q4 conductive and thereby turn the flip-flop 50 in the on condition. If an oscillator pulse is slivered, it nevertheless may operate the transistor Q3, but the period of conduction is not sufficient to raise the signal level across the condenser 51 high enough to render the transistor Q4 conductive and turn the flip-flop 50 in the on condition. The transistors Q4 and Q7 serve as triggering inputs to the flip-flop transistors Q5 and Q6. The collector electrodes of the flip-flops Q5 and Q6 are connected through respective resistors 53 and 54 to sources of operating potential. Whenever the transistor Q4 is rendered conductive, the potential at the upper end of the resistor 53 is substantially at minus 0.1 volt or slightly below ground. Consequently, the transistor Q6 is turned off, and the potential at the upper end of the resistor 54 approaches minus 0.3 volt. This potential is applied to the base of the transistor Q5 and renders it conductive. The potential at the base of the transistor Q11 is approximately minus 0.3 volt. In this condition the flip-flop 50 may be said to be in the One state, and the minus 0.3 volt signal supplied to the base of the transistor Q11 conditions this transistor. The transistor Q11 does not conduct at this point, but it may become conductive if the transistor Q12 is rendered conductive. The transistors Q11 and Q12 constitute an AND circuit 60. With the transistor Q11 of the AND circuit 60 thus conditioned, the next clock pulse from the pulse generator 20 which passes through the transformer T1 drives the base of the transistor Q12 negatively, and the transistor Q11 and Q12 are rendered conductive. Consequently, current flows in the primary winding of the transformer T2, and an output pulse is applied through the secondary winding of the transformer T2 to the base electrodes of the transistors Q8 through Q10. If the push button switch 10, for example, is closed at this instant time, the transistor Q10 has minus 10 volts supplied to its collector, and this transistor is rendered conductive. Consequently, current flows in the primary winding of the transformer T3, and an output pulse is developed in the secondary of this transformer and may be applied on the line 15 to a load device, not shown. The transistors Q8 and Q9 are not rendered conductive by the pulse from the transformer T2 because the switches 11 and 12 are not closed.

When the transistor Q10 conducts, the condenser 70 is charged in a manner to stop current conduction through the transistor Q10. If further pulses from the pulse generator 28 reach the base of transistor Q10, they are not passed to the output line 15 because the transistor Q10 is blocked by the charge on the condenser 70. Should the charge on the condenser 70 tend to leak off, the pulses applied to the base of the transistor Q10 serve to recharge the condenser 70 by slight current conduction through the transistor Q10. This conduction, however, is so slight that the output signal developed on the output line 15 is negligibly small and may be disregarded. It is seen therefore one, and only one, clock pulse from the pulse generator 20 may reach the output line 15 whenever the push button switch 10 is closed.

When the push button switch 10 is released or opened, the collector of the transistor Q10 is deconditioned, and the charge on the condenser 70 in the emitter circuit of the transistor Q10 leaks off through the emitter-base diode circuit of the transistor Q10. The transistor Q10 thus is conditioned for a subsequent operation. While the switch 10 remains closed, the transistor Q13 is rendered conductive. When the switch 10 is released, the potential on the base of the transistor Q13 changes from approximately minus 0.3 volt to some potential at or below ground which causes the transistor Q13 to become nonconductive. When the transistor Q13 becomes nonconductive, the potential at the collector electrode approaches minus 0.3 volt, and this level is applied to the base of the transistor Q7. The minus 0.3 volt applied to the base of the transistor Q7 through the resistor 42 causes this transistor to conduct, and the potential at the upper end of the resistor 54 changes from minus 0.3 volt to some value slightly below ground. This potential is applied to the base of the transistor Q5, rendering it nonconductive. The potential at the upper end of the resistor 53 approaches minus 0.3 volt, and this potential is applied to the base of the transistor Q6 and renders it conductive. In this condition the flip-flop 50 may be said to be in the Zero state, and the signal applied to the base of the transistor Q11 is at or slightly below ground, and it deconditions this transistor and thereby prevents the AND circuit 60 from passing pulses from the pulse generator 20 to the transistors Q8 through Q10.

In order to illustrate the overall operation of the circuit in the drawing, let it be assumed that the push button switch 11 is closed at an instant of time when a pulse from the pulse generator 20 is being applied to the transistor Q2. Let it be assumed further that the signal applied to the transistor Q1 by closure of the push button switch 11 and the pulse applied to the transistor Q2 by the pulse generator 20 operate the AND circuit 21 to sliver the pulse from the pulse generator 20. The slivered pulse is applied across the secondary of the transformer T1 to the base of the transistor Q3, rendering this transistor conductive. The slivered pulse causes current flow through the condenser 51 and the resistor 52, and because this circuit acts as an integrator, the current pulse is averaged with respect to time. The slivered pulse, being of shorter duration than a full width pulse from the pulse generator 20, does not cause sufficient output signals from the condenser 51 and resistor 52 to the base of the transistor Q4 to render it conductive, or if the signal applied to the transistor is sufficient in magnitude to operate it in the conductive state, the time duration is not sufficiently long to effect a change in state of the flip-flop 50. Consequently, the slivered pulse from the AND circuit 21 is not effective to change the flip-flop 50 and it in turn condition the AND circuit 60. The next pulse passed by the AND circuit 21 from the generator 20 is a full width pulse, and when averaged by the transistor Q3, condenser 51 and resistor 52, the resultant output signal renders the transistor Q4 conductive sufficiently long to operate the flip-flop 50 and change it from the Zero state to the One state, thereby conditioning the transistor Q11 of the AND circuit 60. The first full width oscillator pulse which effects the change in state of the oscillator 50 is also applied to the base of the transistor Q12 of the AND circuit 60. The time it takes to change the state of the flip-flop however is greater in duration than the width of the pulse from the oscillator 20. By the time the transistor Q11 is conditioned by the change in state of the flip-flop 50, the oscillator pulse has disappeared from the base of the transistor Q12, whereby no output signal is developed from the transformer T2. It is seen, therefore, that the first full width oscillator pulse does not get through the AND circuit 60, but it is effective to condition the AND circuit 60 so that the next oscillator pulse may be passed by this AND circuit.

As a result of the foregoing action the next pulse from the pulse generator 20 is applied to the base of the transistor Q3 which in turn develops a pulse at the base of the transistor Q12. Since the preceding pulse changed the flip-flop 50 from the Zero state to the One state, the present pulse is uneventful as far as the flip-flop is concerned. However, the present pulse is passed by the AND circuit 60 because the transistor Q12 is rendered conductive since the transistor Q11 is conditioned, whereby an output pulse is developed on the secondary winding of the transformer T2. Since the switch 11 is still closed, the collector of the transistor Q9 is conditioned so that the pulse on the output winding of the transformer T2 to the base of the transistor Q9 is effective to render this transistor conductive. Consequently, current flow in the transistor Q9 develops an output signal on the secondary of the transformer T5 to the output lead 16 and also charges up the condenser 71. The charge on the condenser 71 prevents the transistor Q9 from conducting in response to subsequent pulses from the oscillator which develop a signal on the secondary of the transformer T2. Consequently, only one pulse is applied to the output line 16 to a load device not shown. Subsequently, the push button switch 11 is released, and when the circuit is opened, the base of the transistor Q13 returns to a potential at or slightly below ground level, whereby this transistor is rendered nonconductive. The potential at the collector of the transistor Q13 is applied to the base of the transistor Q7 and changes the flip-flop from the One state back to the Zero state as earlier explained. This deconditions the transistor Q11 of the AND circuit 60 and prevents further oscillator pulses from passing through the transformer T2. At this point the charge on the condenser 71 discharges through the emitter-base circuit of the transistor Q9 so that the push button switch 11 may be depressed again and the foregoing sequence of operations may be repeated. It is seen that if the switch 10 or the switch 12 is depressed, an output pulse may be developed in like fashion on respective lines 15 or 17.

Accordingly, there is provided a unique and novel circuit arrangement according to this invention which permits one, and only one, pulse to be supplied from an oscillator to any one of a plurality of output devices whenever a given one of a plurality of push button switches are depressed. Furthermore, the output pulse is in synchronism with pulses supplied by the oscillator, and each output pulse has a given duration determined by the full width of the oscillator pulses. Accordingly, slivered pulses are prevented from reaching any one of the plurality of output lines.

What is claimed is:

A pulse generator including a first AND circuit having two input terminals and an output terminal, a plurality of switches coupled to one input terminal of the first AND circuit and adapted to energize this terminal with a signal when any one of them is closed, a pulse generator which supplies a continuous train of pulses coupled to the other input terminal of the first AND circuit, a flip-flop having two input terminals and one output terminal, an integrator coupled between the output terminal of the first AND circuit and one of the input terminals of the flip-flop, a second AND circuit having two input terminals and one output terminal, the output terminal of the flip-flop being connected to one of the input terminals of the second AND circuit, means disposed between the other input terminal of the flip-flop and the plurality of switches which reset the flip-flop when the switches are open, a plurality of gates each having two input terminals and one output means, one input terminal of each gate being connected to a respective one of the switches, the output terminal of the second AND circuit being connected in common to the other terminal of each gate, storage means associated with each gate which charges when a pulse is passed and blocks the passage of further pulses, whereby one full width pulse may be provided from the output means of a selected one of the gates whenever the associated switch is closed and opened.

References Cited in the file of this patent

UNITED STATES PATENTS

| | | |
|---|---|---|
| 2,907,021 | Woods | Sept. 29, 1959 |
| 2,907,896 | Yii | Oct. 6, 1959 |